(12) United States Patent
Hewitt et al.

(10) Patent No.: US 10,972,298 B2
(45) Date of Patent: Apr. 6, 2021

(54) PROACTIVELY MANAGING COLLISIONS OF MULTIPLE CLUSTERING GROUPS FOR COLLABORATIVE MESSAGING PLATFORMS

(71) Applicant: International Business Machines Corporation, Armonk, NY (US)

(72) Inventors: Trudy L. Hewitt, Cary, NC (US); Jeremy R. Fox, Georgetown, TX (US); Jonathan Dunne, County Waterford (IE); Liam S. Harpur, Skerries (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 16/107,380

(22) Filed: Aug. 21, 2018

(65) Prior Publication Data

US 2020/0067724 A1   Feb. 27, 2020

(51) Int. Cl.
  *H04L 12/18*   (2006.01)
  *G06F 17/16*   (2006.01)
  *H04L 29/06*   (2006.01)
  *G06N 5/04*    (2006.01)
  *G06F 16/35*   (2019.01)
  *G06F 16/901*  (2019.01)

(52) U.S. Cl.
  CPC ......... *H04L 12/1831* (2013.01); *G06F 16/35* (2019.01); *G06F 16/9024* (2019.01); *G06F 17/16* (2013.01); *G06N 5/04* (2013.01); *H04L 65/4015* (2013.01)

(58) Field of Classification Search
  CPC ............ H04L 12/1831; H04L 65/4015; G06F 16/9024; G06F 16/35; G06F 17/16; G06N 5/04
  See application file for complete search history.

(56) References Cited

U.S. PATENT DOCUMENTS 7,747,719 B1    6/2010  Horvitz
2010/0268830 A1*  10/2010  McKee ................. G06Q 10/10
                                                  709/228

(Continued)

OTHER PUBLICATIONS

IPCOM000236464D Anonymousanonymous, "Resource allocation with social awareness." IP.com Disclosure No. IPCOM000236464D, Publication Date: Apr. 29, 2014.

*Primary Examiner* — Nicholas R Taylor
*Assistant Examiner* — Tania M Pena-Santana
(74) *Attorney, Agent, or Firm* — Garg Law Firm, PLLC; Rakesh Garg; Michael O'Keefe (57) ABSTRACT

Merging two or more user groups for collaboration includes constructing a social graph of each user of a plurality of users within the two or more user groups based upon a user profile and a workflow associated with each user. A weighted adjacency matrix is calculated based on at least one user interaction between two or more users indicated by the social graph. A model inferring leading edge contributions and least significant edge contributions among the users is generated based upon the social graph and the weighted adjacency matrix. One or more prospective groups expected to be involved in a future collaboration are identified based upon the identified leading edge contributions and least significant edge contributions.

10 Claims, 5 Drawing Sheets

(56) References Cited

U.S. PATENT DOCUMENTS

| | | | |
|---|---|---|---|
| 2012/0087548 A1* | 4/2012 | Wu | G06K 9/00677 |
| | | | 382/115 |
| 2012/0215773 A1* | 8/2012 | Si | G06Q 30/02 |
| | | | 707/723 |
| 2012/0278625 A1* | 11/2012 | Narayanan | H04L 9/006 |
| | | | 713/175 |
| 2013/0297689 A1* | 11/2013 | Bhat | H04L 51/32 |
| | | | 709/204 |
| 2013/0311556 A1 | 11/2013 | Srivastava | |
| 2014/0074893 A1* | 3/2014 | Griffin | G06F 16/9535 |
| | | | 707/798 |
| 2014/0089237 A1* | 3/2014 | Adibi | G06N 7/005 |
| | | | 706/12 |
| 2014/0337279 A1 | 11/2014 | Mo | |
| 2015/0269597 A1* | 9/2015 | French | G06Q 30/01 |
| | | | 705/7.32 |

* cited by examiner

PROACTIVELY MANAGING COLLISIONS OF MULTIPLE CLUSTERING GROUPS FOR COLLABORATIVE MESSAGING PLATFORMS

TECHNICAL FIELD

The present invention relates generally to a method, system, and computer program product for collaborative messaging. More particularly, the present invention relates to a method, system, and computer program product for proactively managing collisions of multiple clustering groups for collaborative messaging platforms.

BACKGROUND

Collaboration tools, such as collaborative messaging applications, allow users to collaborate with one another to accomplish common goals or objectives. Many collaboration tools allow members of a group to have real-time discussions with one another. Collaboration tools such as group chatting systems are becoming increasingly popular for both work and non-work related activities. Collaboration tools are often used among various organizations to allow co-workers to collaborate with one another as well as for customer support. For example, a customer of a business may ask a question regarding a product using the collaboration tool and an employee of the business, such as a customer support person, may provide an answer to the question. Accordingly, chatting programs and other collaboration tools have become an essential component of the daily jobs for members of many organizations.

SUMMARY

The illustrative embodiments provide a method, system, and computer program product. An embodiment of a computer-implemented method for merging two or more user groups for collaboration includes constructing a social graph of each user of a plurality of users within the two or more user groups based upon a user profile and a workflow associated with each user. The embodiment further includes calculating a weighted adjacency matrix based on at least one user interaction between two or more users indicated by the social graph. The embodiment further includes generating a model inferring leading edge contributions and least significant edge contributions among the users based upon the social graph and the weighted adjacency matrix. The embodiment further includes identifying one or more prospective groups expected to be involved in a future collaboration based upon the identified leading edge contributions and least significant edge contributions.

Another embodiment further includes determining an action based upon the to mitigate an effect of an expected collisions among one or more prospective members of the one or more prospective groups. Another embodiment further includes propagating the action to the one or more prospective groups. In another embodiment, the action includes adding a particular prospective user from the future collaboration. In another embodiment, the action includes removing a particular prospective user from the future collaboration.

In another embodiment, calculating the weighted adjacency matrix includes calculating a weighted directed graph based upon the social graph. In another embodiment, the leading edge contributions and least significant edge contributions are based on a product of the number of hops between the two or more users and interactions between the two or more users indicated by the weighted directed graph.

In another embodiment, one or more weighted values of the weighted adjacency matrix are based upon a number of interactions and a nature of each interaction between two users. In another embodiment, a positive interaction between the two users increases a weighted value in the weighted adjacency matrix associated with the two users. In another embodiment, a negative interaction between the two users decreases a weighted value in the weighted adjacency matrix associated with the two users.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to proactively managing collisions of multiple clustering groups for collaborative messaging platforms. When teams collaborate on a new project, it can be difficult for certain employees to adopt new standards, tools and technologies required for the delivery of the project. Employees may spend years using the same applications and programming languages. During a merger or collaboration that requires employees to integrate with other teams who use different technologies, a resistance may exist to adopt these new technologies. Each team may have subjective ideas and reasons regarding why they use particular technologies. As a result, significant time may be spent by the team members in debating the best practice. Furthermore, certain users may struggle to keep up with the adoption and timelines. The impact may be overwhelming for certain users whilst some other users may not be affected as much. Accordingly, a need exists to identify and focus on those group members that will likely be affected by a collaboration or merger of multiple clustering groups.

In an example, a Team A may be required to work with a Team B to develop a new application. Different management methods and procedures may be used by each team and different technologies may be used for each team for application development. A delay in productivity may result, as both teams may want to work with the tools and technologies with which they are most familiar, the delay being due to time taken to reach an agreement on the standards and technologies to be used, as well as the impact on individuals to adopt the change.

Various embodiments described herein are direct to a system for determining if and when multiple collaborative groups are going to collide due to a full or partial merge of group members. In one or more embodiments, the system determines which group members are most likely to affected first by such a collision and monitor those members to understand the effects. In one or more embodiments, the system determines other group members who will be effected based on the results. Over time the system can assist with the collision to help reduce the negative aspects of a group merge and promote the positive effects of the merge to those that will likely be affected.

One or more embodiments are directed to a system and method for dynamically creating clusters of users/team members based on their attributes and behaviors, both historically and in real-time. In one or more embodiments, the system evaluates group clusters of users to dynamically group and/or combine the group clusters based on projected intersection points, as well as separate and/or remove cluster groupings if a disparity is determined.

In an embodiment, a system monitors and manages a collision of multiple groups of users by analyzing user profiles of users and their associated workflows within an organization and constructing a social graph based upon the analysis. A social graph is a graph that depicts relations and historical interactions of users in a social network. In short, a social graph is a model or representation of a social network. The social graph has been referred to as "the global mapping of everybody and how they're related" for a social networking platform. In a particular embodiment, the user profile and workflow of a user includes information indicative of working relationships and interactions of the user with other users.

In the embodiment, the system analyzes user interactions from the social graph and derives a weighted adjacency matrix from the user interactions. In a general sense, an adjacency matrix is a data structure used to represent a graph in which the elements of the matrix indicate whether pairs of vertices are adjacent to or not in the graph. In the embodiment, relationships and historical communications between users in the social graph are represented by a weighted directed graph generated from the social graph. In general, a weighted directed graph is a graph including a set of vertices connected by edges in which the edges have a direction associated with them. In the embodiment, weights for the weighted directed graph are determined based upon the connections and communications between users.

In the embodiment, a user having a connection with another user is counted as a positive connection and the data is tabulated within a matrix grid. The more positive a communication between two users, the greater the weighted value in the weighted directional graph and the corresponding weighted adjacency matrix. A negative or non-positive communication or interaction between users reduces the corresponding weight in the weighted directional graph and the corresponding adjacency matrix. In particular embodiments, JavaScript Object Notation (JSON) attributes are added to messaging identifiers (IDs) between users in a workspace to annotate to whom a particular message is targeted and persist a message count to obtain interaction totals to facilitate tracking of interactions between users.

In the embodiment, the system models the social graph and weighted adjacency matrix to infer leading and least significant edge contributions among the users. In a particular embodiment, the leading and least significant edge contributions are based, at least in part, on a product of the number of transversals or hops between users and the relative communications therebetween. The greater the product, the greater the inference can be made that the user is a leading edge contributor. By modelling across both sets of vectors, the system obtains an additional contextual layer that allows the identification of edge graph collisions. Consider a scenario in which multiple edge contributors exist and conflicting (positive and negative information) is communicated from two users. In such a situation, the negative communication is propagated to give highly skewed negative weight. In this situation, two positive edge contribution cancel the weight to a neutral weight (e.g., 0). This positive and negative inference is known as an edge graph collision.

In the embodiment, the system identifies other similar disparate groups that will likely be involved in a similar group collaboration and propagates actions and/or behaviors to the similar disparate groups. In a particular embodiment, topic analysis message data and the directional and frequency vectors from the weighted adjacency matrix is sued to identify and remediate specific collisions within group interaction between users. In an example, in a real time chat room the system identifies positive and negative contributions from distinct users and identifies users who are likely to lead to edge collisions. For a new topic with a new chat space, as contributions begin to follow a destructive edge collision scenario the system invites users with a positive collective contribution to join the discussion within the new chat space.

In one or more embodiments, when two or more groups of users collide, the system monitors the potential and real-time effects of the collision and helps to ascertain the positive and negative impacts of a collision. As a result, the speed that a team can come together is enhanced, thus mitigating systemic challenges. Similarly, if two teams are to be merged for a particular project, the system determines the enablers, potential conflicts, and potential interests that can enable the teams to seamlessly integrate and reduce the time taken to come to deliver the project. Accordingly, various embodiments are directed to removing the concept of static groups and instead enables dynamic clustering of users based on real-time and historical behavior and attributes.

In an example user case, Team A and Team B have recently merged and the first project of several projects to develop is to jointly deliver an application for a particular platform. Team A has traditionally used C++ as a programming language, Information Technology Infrastructure Library (ITIL) practices for project management and a range of in-house applications. Team B has always used Java™ as a programming language with a range of third-party applications. The programmers from Team A are committed and dedicated to the in-house technologies, while the programmers at Team B have always used the third-party technologies. When the two groups collide, twenty percent (20%) of the employees from each group will struggle to adopt change.

In the example, the system monitors for the potential and real-time collision of the groups (Team A and Team B), measures the impact/effect on each of the individual users/groups, and deduces from the findings the impact and/or potential impact on other potential groups In the example, the system may have previously experienced this kind of merger and through historical analysis will have determined what has helped accelerate the relationship in the past. For example, if weekly meetings have a proven track record then the system may recommend weekly meetings as an action for the present application. If additional resources have increased productivity and reduced the timeline, then the system may also make a recommendation to increase resources.

In the example, the system automatically groups users to determine the potential impact as more groups are brought into the collaboration and the extent of the impact, and determine the support that the users may require to reduce conflict or adoption issues. For example, for a Group 1 the system monitors the effects of the collision and who the collision impacted the most. From this initial collision, the system determines who will be effected first and/or most by the and work towards a smoother transition for a following collision of Group 2. For example, for a Group 1 including management users, the initial impact may be determined to be a medium impact. For a Group 2 including project management users, a secondary impact may be determined to be a low impact. For a Group 3 including Programmers, the impact may be determined to be a high impact. For example, Group 1 may have a collision based on the technologies to be used in the design and build, how resources will be assigned and determination of timelines. Group 2 may collide on the management standards or methods to be used. For example, the system may highlight the risks and flag ways to come to a compromise or reshuffle the users to accommodate the greater majority of resource based upon determination from the authentication/social profile of employees that one team may not have skills and/or capacity to work on a given standard. Accordingly, not only do one or more embodiments of the system provide pre-engagement recommendations based on analysis and historical data but it also monitors the impact of the collision.

In another example, Group 3 may collide because Team A's programmers are primarily C++ enabled and management have chosen to employ Java™ for development. The system may determine that only 20% of Team A's Group 3 member have the desired skills and experience using the chosen tools indicative that there will also be a collision that will cause disruption. In an example, the system may upskill the resources as soon as the system has performed an initial run.

In an embodiment, the system receives input from previous historical data on projects as well as real-time information for each individual group. In the embodiment, users are grouped into clusters of attributes and/or behaviors and into clusters of severity of impact for those clusters of attributes and behaviors. In particular embodiments, the input data the input may be obtained from users' social profiles in which users have interaction with topics, technologies, and/or contexts used in the past. Input data may also be obtained from historical data when individuals have engaged with teams. In particular embodiments, historical data may include calendaring and scheduling information, electronic mail (Emails), and project management information (e.g., analysis of speed of adoption toward new applications and languages).

In another embodiment, the system identifies user behavior/attributes across different groupings (social, work, etc.) and determines if the users could be utilized differently based on their attributes/behaviors demonstrated in other aspects of their life. In another embodiment, the system considers personal dynamics (e.g., relationships) between users when considering clustering. For example, if a User A and a User B dated previously and ended the relationship, the system may avoid pairing user A and user B together in a group.

An embodiment can be implemented as a software application. The application implementing an embodiment can be configured as a modification of an existing collaborative messaging system or platform, as a separate application that operates in conjunction with an existing collaborative messaging system or platform, a standalone application, or some combination thereof.

The illustrative embodiments are described with respect to certain types of collaboration tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
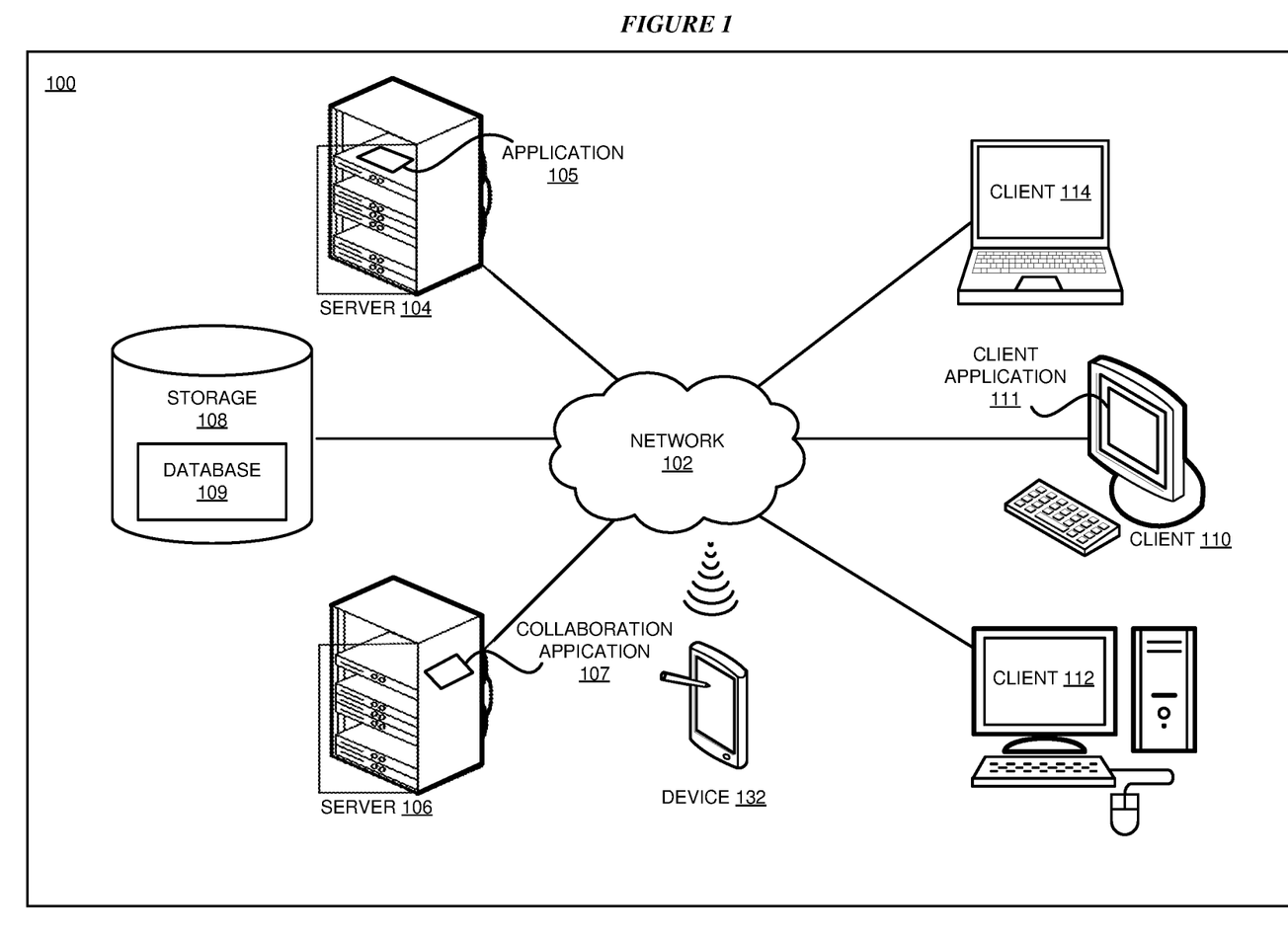
FIG. 1 depicts a block diagram of a network of data processing systems in which illustrative embodiments may be implemented.
Figure 2:
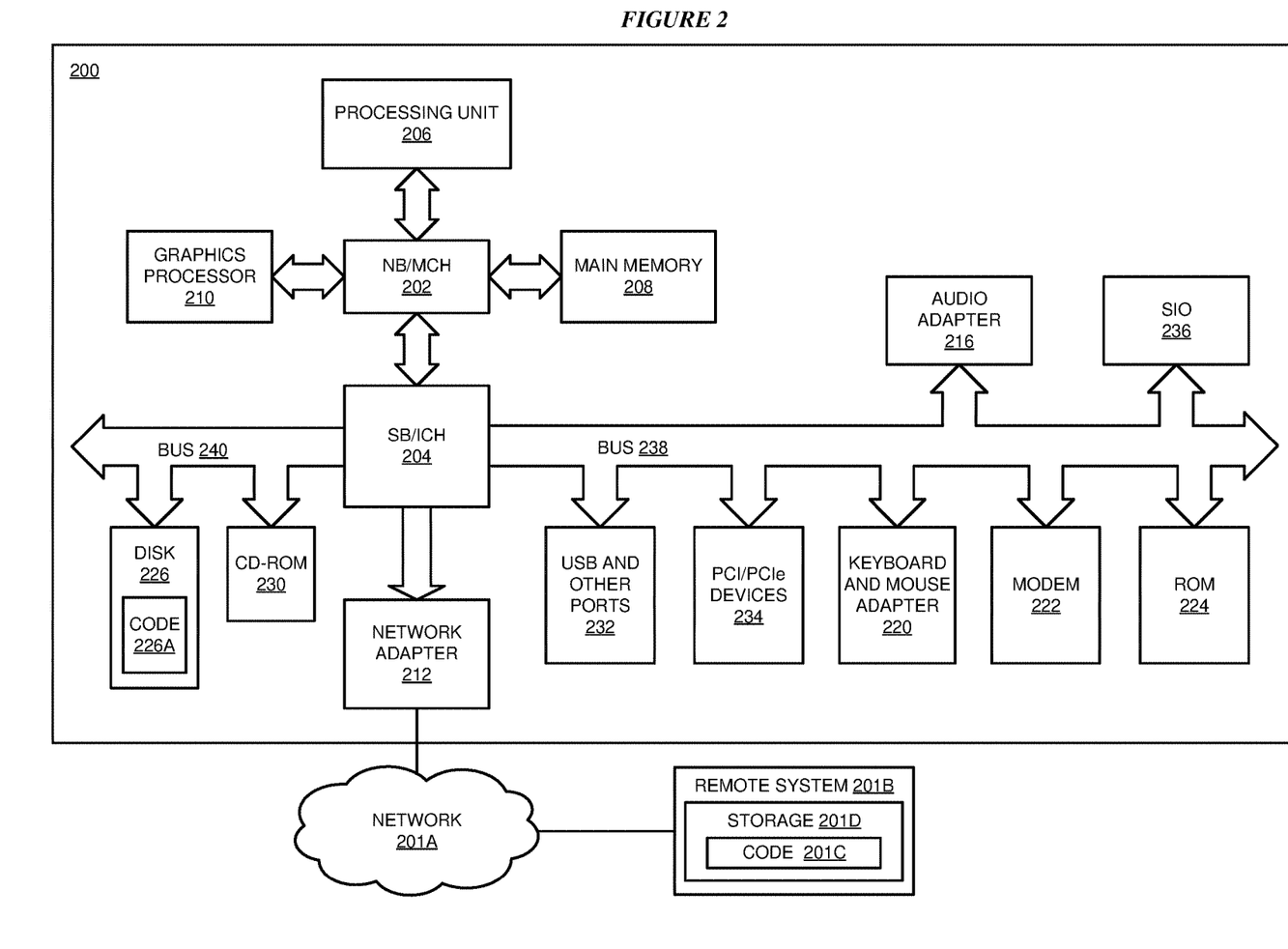
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a client application 134 configured to perform functions of client application 134 described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for proactively managing collisions of multiple clustering groups for collaborative messaging platforms in accordance with one or more embodiments.

Server 106 implements a collaboration application 107 configured to allow users to collaborate using one or more collaborative messaging sessions as described herein with respect to various embodiments. Storage device 108 includes one or more databases 109 configured to store data such as user profile information associated with users of collaboration application 107. Client 110 includes a client application 111 configured to allow a user to participate in a collaborative messaging session as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
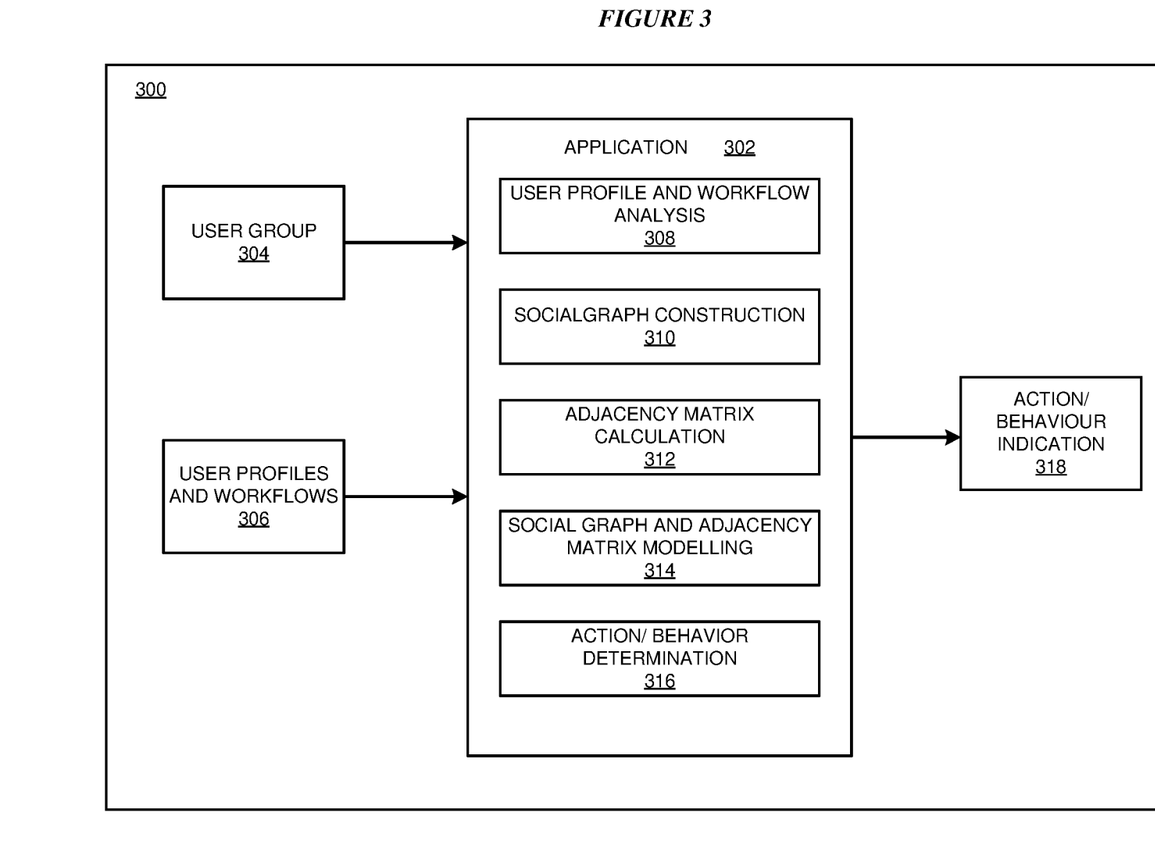
FIG. 3 depicts a block diagram of an example configuration for proactively managing collisions of multiple clustering groups for collaborative messaging platforms in accordance with an illustrative embodiment.

With reference to FIG. 3, this figure depicts a block diagram of an example configuration 300 for proactively managing collisions of multiple clustering groups for collaborative messaging platforms in accordance with an illustrative embodiment. The example embodiment includes an application 302. In a particular embodiment, application 302 is an example of application 105 of FIG. 1.

Applicant 302 receives a user group identification 304 and user profiles and workflows 306 for members of the user group. Application 302 includes a user profile and workflow analysis component 308, a social graph construction component 310, an adjacency matrix calculation component 312, a social graph and adjacency modelling component 314, and an action/behavior determination component 316. In the embodiment, user profile and workflow analysis component 308 analyzes user profiles of users and their associated workflows within an organization. Social graph construction component 310 constructs a social graph based upon the analysis. In a particular embodiment, the social graph includes information indicative of working relationships and interactions among users.

Adjacency matrix calculation component 312 analyzes user interactions from the social graph and derives a weighted adjacency matrix from the user interactions. Social graph and adjacency modelling component 314 models the social graph and weighted adjacency matrix to infer leading and least significant edge contributions among the users. Action/behavior determination component 316 identifies and/or predicts other similar disparate groups that are likely be involved in a similar group collaboration and determines actions and/or behaviors to the similar disparate groups to mitigate the effects of collisions among members of the disparate groups. Application 302 outputs an action/behavior indication 318 indicative of the determined actions/behaviors.

Figure 4:
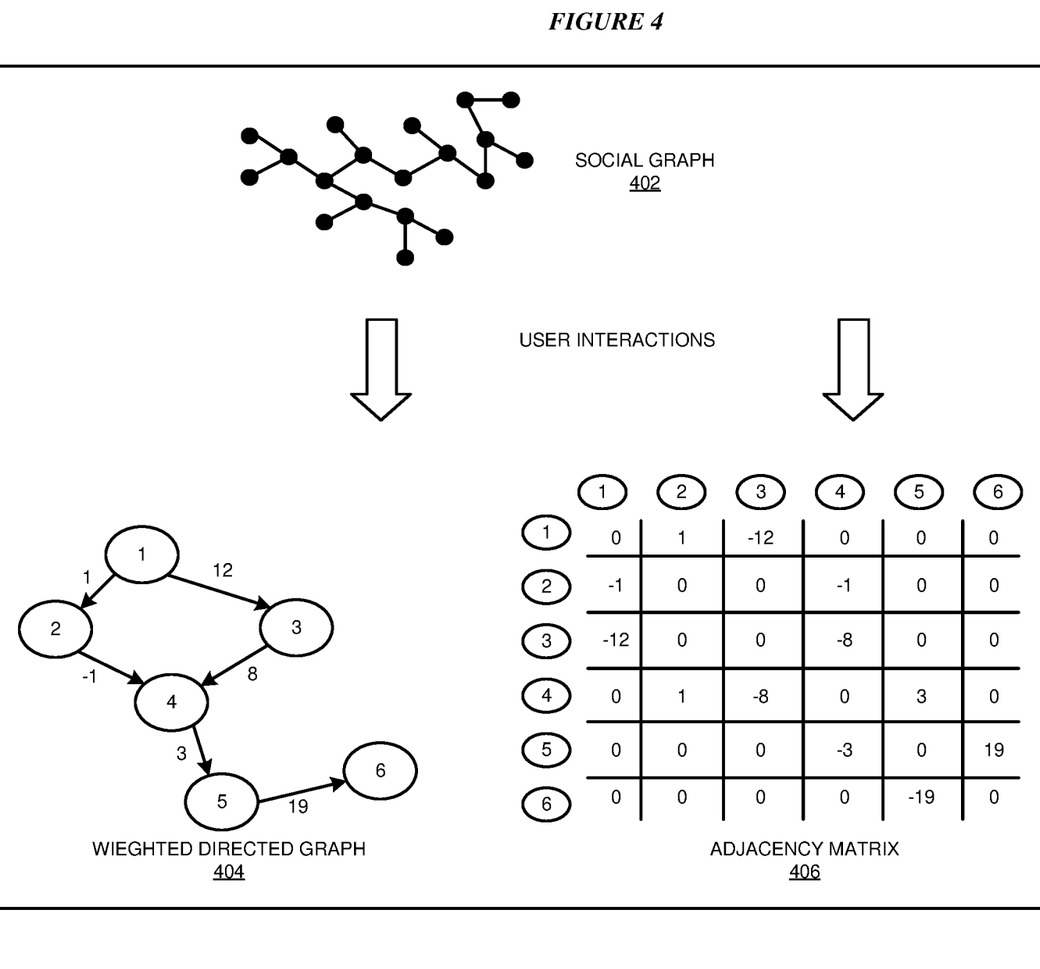
FIG. 4 depicts an example process for constructing an adjacency matrix from a social graph in accordance with an illustrative embodiment.

With reference to FIG. 4, this figure depicts an example process 400 for constructing an adjacency matrix from a social graph in accordance with an illustrative embodiment. In the embodiment, a social graph 402 is analyzed to determine a weighted directed graph 404 based upon user interactions indicated in social graph 402. In the embodiment, weights for the weighted directed graph are determined based upon the number of interactions and a nature of each of the interactions between users. In the embodiment, a user having a connection with another user is counted as a positive connection and the data is tabulated within a matrix grid. The more positive a communication between two users, the greater the weighted value in the weighted directional graph and the corresponding weighted adjacency matrix. A negative or non-positive communication or interaction between users reduces the corresponding weight in the weighted directional graph and the corresponding adjacency matrix.

In the example of FIG. 4, a weighted directed graph having six users (user 1, user 2, user 3, user 4, user 5, and user 6) is shown with weighted directional arrows between users. In the example, a weight of 12 between user 1 and user 3 indicates a strong positive weight between the user pair. A negative weight as in the case between user 2 and user 4 having a weight of −1 indicates a non-positive single interaction between user 2 and user 4. As further depicts in FIG. 4, the connection between user 1 and user 2 has a weight of 1, the connection between user 3 and user 4 has a weight of 8, the connection between user 4 and user 5 has a weight of 3, and the connection between user 5 and user 6 has a weight of 19.

In the embodiment, a weighted adjacency matrix 406 is determined from weighted directed graph 404. In the embodiment, leading edge and least significant edge contributions are calculated from the adjacency matrix 406 based on the number of transversals or hops between users and the relative communications therebetween. An edge contribution is a contribution from a user that is distant from a parent user. For example, a user may be distant by virtue of being party to a communication through a multi-hop communication. Taking the graph from Step 2, User 6 may be seen as an edge contributor to user 1 given the traversal from 1->2->4->5->6

An example calculation is as follows:

Hop 1 (1)->(2) (1×1)=(1)

Hop 2 (2)->(4) (1×−1)=(−1)

Hop 3 (4)->(5) (1×3)=(3)

Hop 4 (5)->(6) (1×19)=(19)

The total weight of all contributions of the hop sequence is determined by summing the results of each hop calculation. In the particular example, the total weight is equal to 22. Hop 4 contributes to 19 of the 22 leading to a contribution of 86%. Thus, it can be inferred that user 6 is a leading edge contributor.

Figure 5:
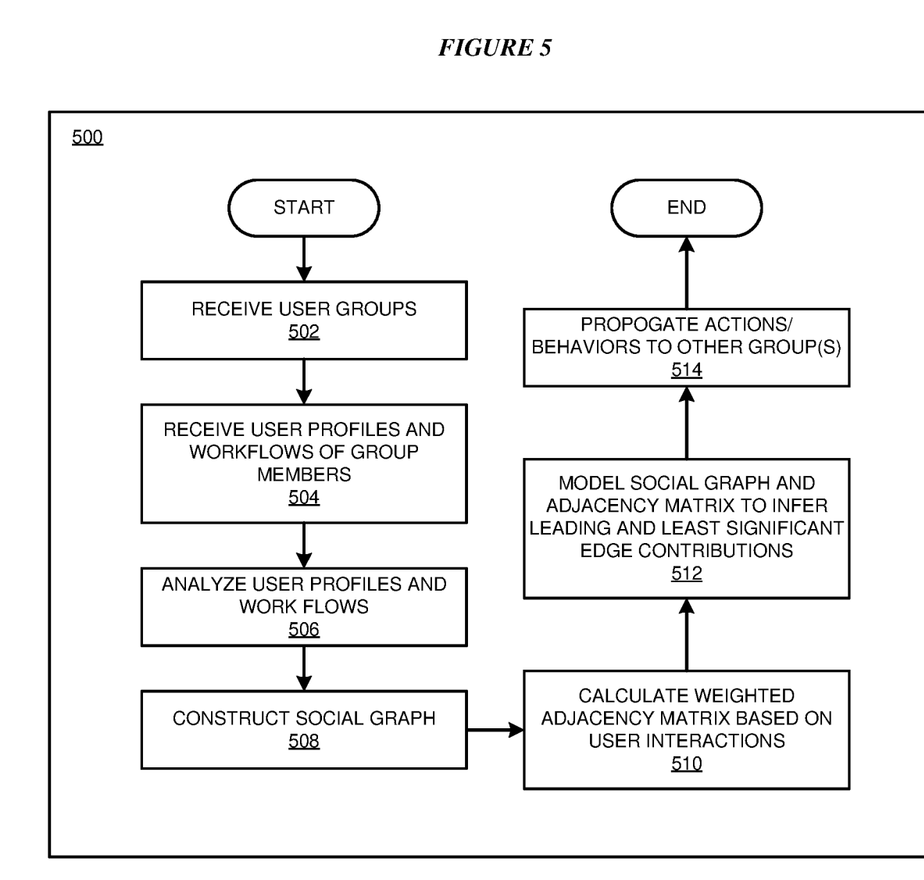
FIG. 5 depicts a flowchart of an example process for proactively managing collisions of multiple clustering groups for collaborative messaging platforms in accordance with an illustrative embodiment.

With reference to FIG. 5, this figure depicts a flowchart of an example process 500 for proactively managing collisions of multiple clustering groups for collaborative messaging platforms in accordance with an illustrative embodiment. In block 502, application 105 receives an identification of two or more user groups for collaboration. In block 504, application 105 receives user profiles and associated workflows within an organization. In block 506, application 105 analyzes the user profiles and associated workflows.

In block 508, application 105 and constructs a social graph of each user within the one or more groups and of a workflow associated with each user based upon the analysis. In a particular embodiment, the user profile and workflow of a user includes information indicative of working relationships and interactions of the user with other users. In block 510, application 105 calculates a weighted adjacency matrix based on user interactions of each user. In an embodiment, the user interactions include historical communications and/or interactions between users in the social graph. In ab embodiment, weights for the weighted adjacency matrix are determined based upon a number of interactions between and a nature of each interaction (e.g., positive or negative) between two of the users. In a particular embodiment, a positive interaction between two users increases a weighted value in the weighted adjacency matrix associated with the two users, and a negative interaction between two users decreases a weighted value in the weighted adjacency matrix associated with the two users.

In block 512, application 105 generates a model inferring leading edge contributions and least significant edge contributions among the users based upon the social graph and the weighted adjacency matrix. In a particular embodiment, the leading and least significant edge contributions are based, at least in part, on a product of the number of transversals or hops between users and the relative interactions therebetween. The greater the product, the greater the inference can be made that the user is a leading edge contributor. In block 514, application 105 identifies one or more prospective groups expected to be involved in a future collaboration based upon the identified leading edge contributions and least significant edge contributions, determining actions and/or behaviors to mitigate an effect of an expected collision among one or more prospective members of the one or more prospective groups and propagates actions and/or behaviors to the one or more prospective groups. In a particular embodiment, an action includes adding and/or removing a particular prospective user from the future collaboration. Process 500 then ends.

Thus, a computer implemented method, system or apparatus, and computer program product are provided in the illustrative embodiments for proactively managing collisions of multiple clustering groups for collaborative messaging platforms and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for merging two or more user groups for collaboration, the method comprising:
    constructing a social graph of each user of a plurality of users within the two or more user groups based upon a user profile and a workflow associated with each user;
    calculating a weighted adjacency matrix based on a set of user interactions between two or more users indicated by the social graph, the weighted adjacency matrix comprising a data structure representing a weighted directed graph, the weighted directed graph representing the set of user interactions, a vertex of the weighted directed graph representing a user, an edge of the weighted directed graph representing an interaction between two users, wherein one or more weighted values of edges of the weighted directed graph are increased corresponding to a degree of positivity of the interaction, and wherein one or more weighted values of edges of the weighted directed graph are decreased corresponding to a degree of negativity of the interaction;
    generating a model inferring leading edge contributions and least significant edge contributions among the users based upon the social graph and the weighted adjacency matrix, wherein an edge contribution between a pair of users comprises a degree of positivity of a distant interaction between the pair of users, the distant interaction comprising a set of edges of the weighted directed graph in a path in the weighted directed graph between the pair of users, the path including at least one vertex other than vertices representing the pair of users, the edge contribution calculated by summing a set of weighted values in the weighted directed graph, each weighted value in the set of weighted values corresponding to an edge in the path, a leading edge contribution comprising a highest value of a set of edge contributions, a least significant edge contribution comprising a lowest value of a set of edge contributions;
    identifying, within the plurality of users, using the edge contributions, an edge graph collision between users within a group expected to be involved in a future collaboration, the edge graph collision representing a pair of users within the group having a distant interaction with an edge contribution having a zero weight; and
    determining an action to remediate the edge graph collision, the action comprising adding a user with a leading edge contribution to the future collaboration.

2. The computer-implemented method of claim 1, wherein the action includes removing a particular prospective user from the future collaboration.

3. The computer-implemented method of claim 1, wherein calculating the weighted adjacency matrix includes calculating the weighted directed graph based upon the social graph.

4. The computer-implemented method of claim 1, wherein one or more weighted values of the weighted adjacency matrix are based upon a number of interactions between two users.

5. A computer usable program product comprising one or more computer-readable storage devices, and program instructions stored on at least one of the one or more storage devices, the stored program instructions comprising:
    program instructions to construct a social graph of each user of a plurality of users within two or more user groups based upon a user profile and a workflow associated with each user;
    program instructions to calculate a weighted adjacency matrix based on a set of user interactions between two or more users indicated by the social graph, the weighted adjacency matrix comprising a data structure representing a weighted directed graph, the weighted directed graph representing the set of user interactions, a vertex of the weighted directed graph representing a user, an edge of the weighted directed graph representing an interaction between two users, wherein one or more weighted values of edges of the weighted directed graph are increased corresponding to a degree of positivity of the interaction, and wherein one or more weighted values of edges of the weighted directed graph are decreased corresponding to a degree of negativity of the interaction;
    program instructions to generate a model inferring leading edge contributions and least significant edge contributions among the users based upon the social graph and the weighted adjacency matrix, wherein an edge contribution between a pair of users comprises a degree of positivity of a distant interaction between the pair of users, the distant interaction comprising a set of edges of the weighted directed graph in a path in the weighted directed graph between the pair of users, the path including at least one vertex other than vertices representing the pair of users, the edge contribution calculated by summing a set of weighted values in the weighted directed graph, each weighted value in the set of weighted values corresponding to an edge in the path, a leading edge contribution comprising a highest value of a set of edge contributions, a least significant edge contribution comprising a lowest value of a set of edge contributions;
    program instructions to identify, within the plurality of users, using the edge contributions, an edge graph collision between users within a group expected to be involved in a future collaboration, the edge graph collision representing a pair of users within the group having a distant interaction with an edge contribution having a zero weight; and
    program instructions to determine an action to remediate the edge graph collision, the action comprising adding a user with a leading edge contribution to the future collaboration.

6. The computer usable program product of claim 5, wherein the action includes removing a particular prospective user from the future collaboration.

7. The computer usable program product of claim 5, wherein calculating the weighted adjacency matrix includes calculating the weighted directed graph based upon the social graph.

8. The computer usable program product of claim 5, wherein the computer usable code is stored in a computer readable storage device in a data processing system, and wherein the computer usable code is transferred over a network from a remote data processing system.

9. The computer usable program product of claim 5, wherein the computer usable code is stored in a computer readable storage device in a server data processing system, and wherein the computer usable code is downloaded over a network to a remote data processing system for use in a computer readable storage device associated with the remote data processing system.

10. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to construct a social graph of each user of a plurality of users within two or more user groups based upon a user profile and a workflow associated with each user;

program instructions to calculate a weighted adjacency matrix based on a set of user interactions between two or more users indicated by the social graph, the weighted adjacency matrix comprising a data structure representing a weighted directed graph, the weighted directed graph representing the set of user interactions, a vertex of the weighted directed graph representing a user, an edge of the weighted directed graph representing an interaction between two users, wherein one or more weighted values of edges of the weighted directed graph are increased corresponding to a degree of positivity of the interaction, and wherein one or more weighted values of edges of the weighted directed graph are decreased corresponding to a degree of negativity of the interaction;

program instructions to generate a model inferring leading edge contributions and least significant edge contributions among the users based upon the social graph and the weighted adjacency matrix, wherein an edge contribution between a pair of users comprises a degree of positivity of a distant interaction between the pair of users, the distant interaction comprising a set of edges of the weighted directed graph in a path in the weighted directed graph between the pair of users, the path including at least one vertex other than vertices representing the pair of users, the edge contribution calculated by summing a set of weighted values in the weighted directed graph, each weighted value in the set of weighted values corresponding to an edge in the path, a leading edge contribution comprising a highest value of a set of edge contributions, a least significant edge contribution comprising a lowest value of a set of edge contributions;

program instructions to identify, within the plurality of users, using the edge contributions, an edge graph collision between users within a group expected to be involved in a future collaboration, the edge graph collision representing a pair of users within the group having a distant interaction with an edge contribution having a zero weight; and program instructions to determine an action to remediate the edge graph collision, the action comprising adding a user with a leading edge contribution to the future collaboration.

* * * * *